Sept. 10, 1929.   R. W. JOY   1,727,649
TRUCK FOR ARTICULATED CARS
Filed May 10, 1928   2 Sheets-Sheet 1
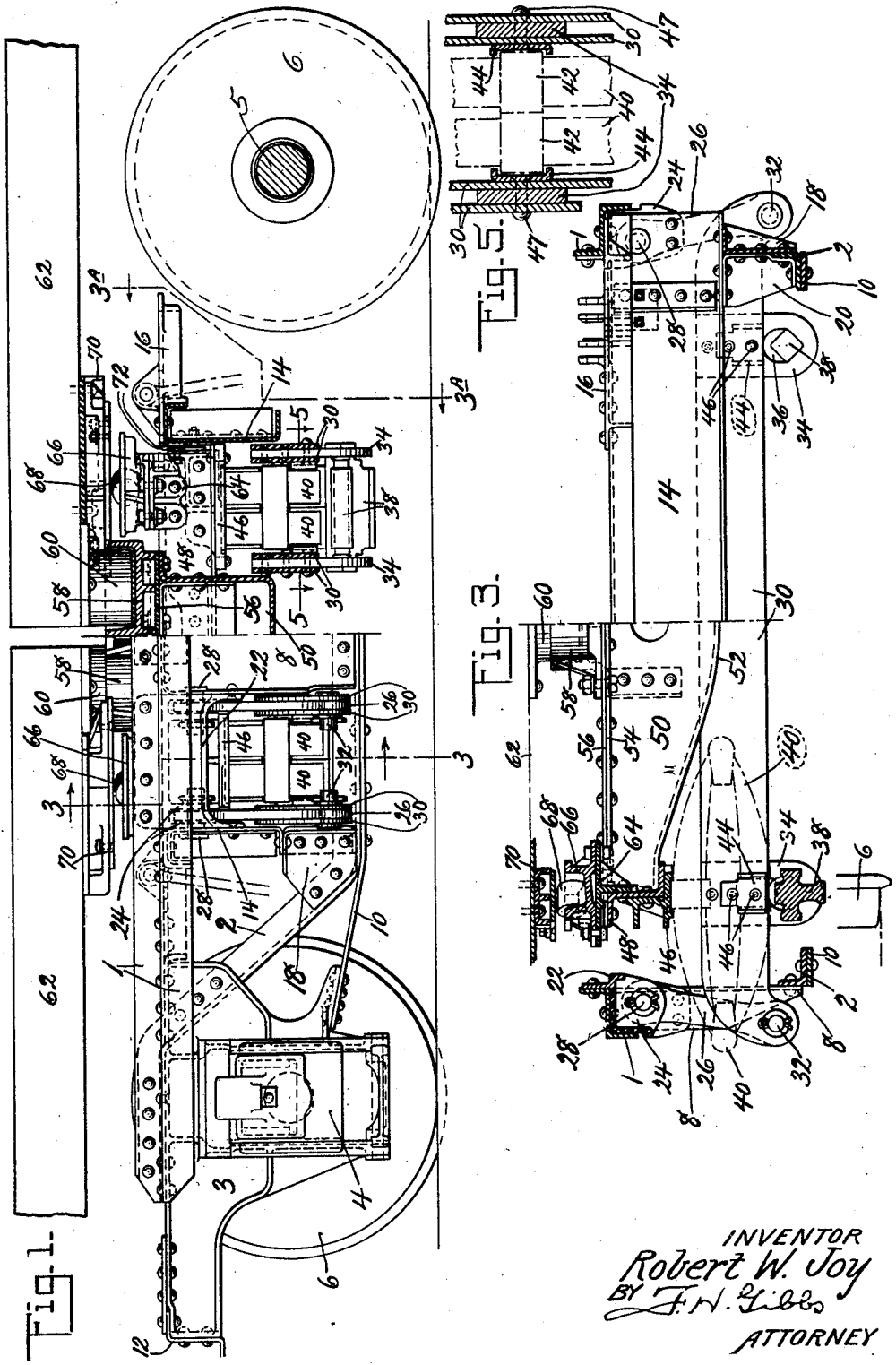
INVENTOR
Robert W. Joy
BY F. H. Gibbs
ATTORNEY Sept. 10, 1929.                R. W. JOY                1,727,649
                    TRUCK FOR ARTICULATED CARS
                  Filed May 10, 1928      2 Sheets-Sheet 2
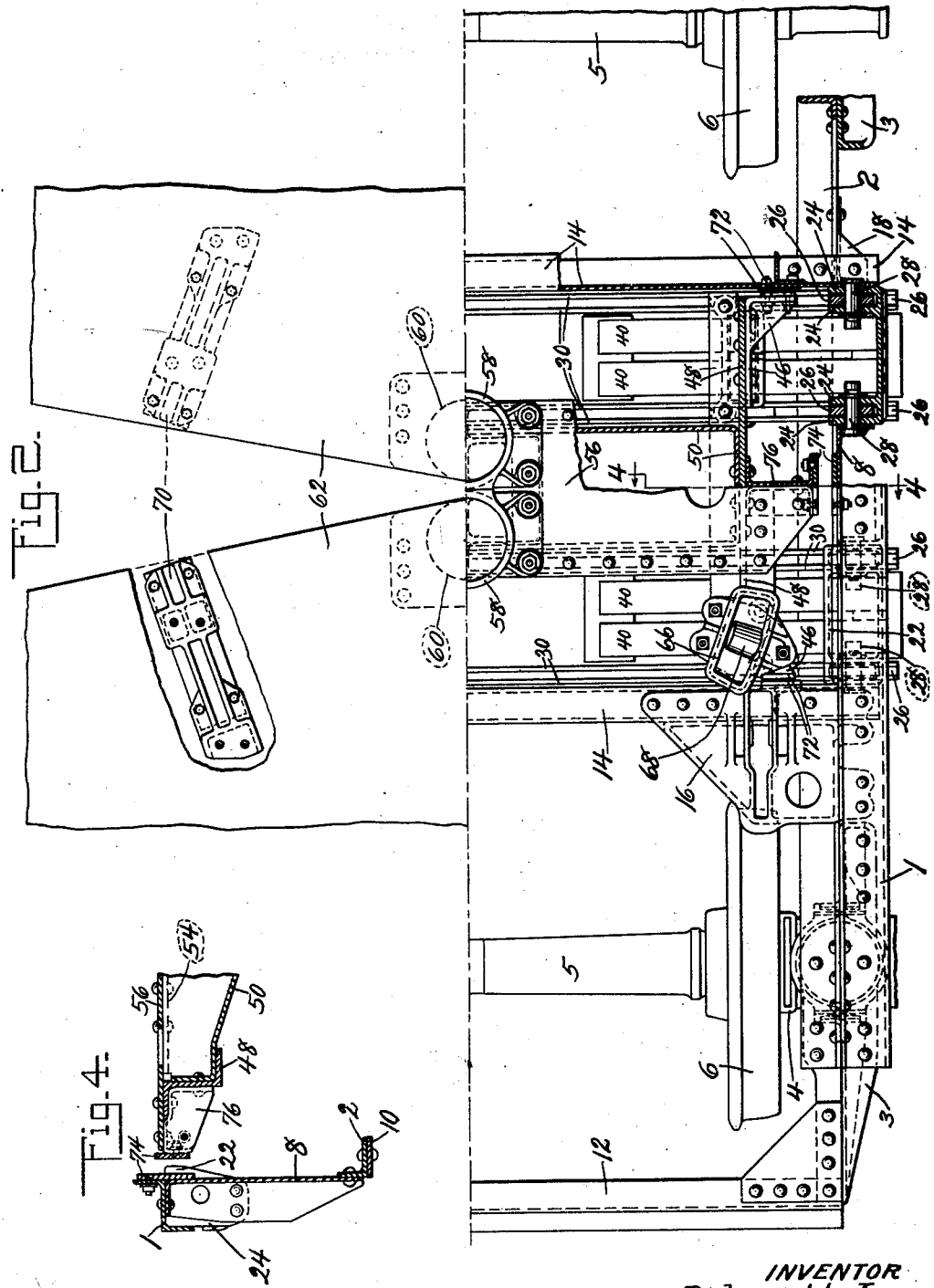
INVENTOR
Robert W. Joy
BY F. H. Gibbs
ATTORNEY Patented Sept. 10, 1929.

1,727,649

UNITED STATES PATENT OFFICE.

ROBERT W. JOY, OF BROOKLYN, NEW YORK, ASSIGNOR TO AMERICAN CAR AND FOUNDRY COMPANY, OF NEW YORK, N. Y., A CORPORATION OF NEW JERSEY.

TRUCK FOR ARTICULATED CARS.

Application filed May 10, 1928. Serial No. 276,610.

This invention relates to railway car trucks and more particularly to car trucks for articulated cars of the type in which a truck supports the ends of adjacent car bodies, and it is an object of this invention to provide a truck of the type described which will provide suitable supports for the ends of both car bodies on a truck bolster having lateral motion. It is also an object of this invention to support the side bearings for both bodies in such manner that the side bearings will be moved laterally with and to the same extent as the center bearings.

In the drawings:

Fig. 1 shows a car truck constructed in accordance with this invention, the half to the left in this figure being in side elevation and the half to the right in this figure being in central longitudinal section;

Fig. 2 is a view in plan of the structure shown in Fig. 1, the top half of this figure showing the car bodies, part of one being broken away to show the body side bearing more clearly, and the bottom half of this figure showing the truck, parts being broken away to show other parts more clearly;

Fig. 3 is a view showing at the left a section taken on the line 3—3 of Fig. 1 and at the right a section taken on the line 3ᴬ—3ᴬ of Fig. 1;

Fig. 4 is a fragmentary section taken on the line 4—4 of Fig. 2; and

Fig. 5 is a fragmentary section taken on the line 5—5 of Fig. 1.

As shown in the drawings, a truck constructed in accordance with this invention comprises truck side frames formed of Z-bar compression members 1 and angle bar tension members 2 joined together and to pedestal castings 3 at their ends. In the pedestals 3 are mounted journal boxes 4 in which are journaled axles 5 having wheels 6 mounted thereon. The tension members 2 are bent downwardly and spaced from the compression members 1 for the greater part of their length and at their centers the tension members 2 and compression members 1 are connected by diaphragms 8. Tie members 10 connecting the truck pedestals on each side of the truck are connected to the tension members 2 at the center of the truck. The side frames of the truck are connected at the ends of the truck by transoms 12 attached to the pedestal castings 3 and adjacent the center of the truck but spaced from the diaphragms 8 the side frames are connected by transoms 14 which are connected directly and by brake hanger support plates 16 to the compression members 1 and by pressed angle gussets 18 and 20 to the tension member 2.

Extending between the diaphragms 8 and transoms 14 are brackets 22 which are attached to the diaphragms 8, transoms 14 and tension members 1 and are provided with spaced pairs of ears or lugs 24 in which swing links 26 are pivotally mounted by means of pins 28. The lower ends of oppositely positioned swing links 26 are joined by pairs of bars 30 extending transversely of the truck and between which the swing links are received and to which the swing links are pivotally connected by pins 32. Mounted between the pairs of bars 30 adjacent the swing links 26 are stirrups 34 which project below the bars 30 and are provided with openings 36 in which are mounted adjustable spring supports 38. Mounted on the spring supports 38 are elliptical springs 40 held in position on the spring supports 38 by the engagement of the spring bands 42 by vertically arranged clips 44 secured to the bars 30 by the rivets 47 which secure the stirrups 34 thereto.

Mounted on the springs 40 are spring caps 46 and the spring caps 46 on each side of the truck are connected together by Z-bars 48. At their centers the Z-bars 48 support and are connected by the truck bolster 50 comprising a pressed trough-shaped member 52 of greater depth at the center than at the ends and provided with outwardly projecting flanges 54 joined by a top cover plate 56. On the cover plate 56 are mounted separate truck center bearings 58 in which pivot the body center bearings 60 attached to the ends of the car bodies 62. To the Z-bars 48 at each spring cap 46, there is attached a bracket 64 which supports a roller side bearing 66, the roller 68 of which cooperates with a suitable body side bearing 70 attached to the car body. To the spring caps 46 and transoms 14 are attached wear plates 72 which engage to prevent excessive movement of the bolster 50 and Z-bars 48 longitudinally of the truck while wear plates 74 attached to tension members 1 and brackets 76 forming extensions of the bolster 50 engage to prevent excessive movement of the bolster 50 and Z-bars 48 transversely of the truck.

From the foregoing description it will be clear that the construction provides separate supports for the adjacent car ends upon a common bolster; that the Z-bars 48 form arms which provide a four point support for the bolster with the points of support on spring spaced from the bolster sufficiently to cause the bolster to ride steadily; that the side bearings are positioned directly over the springs and outwardly from the longitudinal axis of the body; and that both center and side bearings will move simultaneously and equal distances irrespective of the direction of movement.

It is to be understood that the drawings herein are for illustrative purposes only and that various changes in the form and proportions of the device may be made within the scope of the appended claims without departing from the spirit of the invention.

What is claimed is:

1. In a truck for articulated cars comprising side frames, spaced pairs of swing links carried by said side frames, bars connecting oppositely positioned swing links, adjustable spring supports carried by said bars, springs mounted on said spring supports, a bolster having transversely projecting arms at its ends mounted on said springs, a plurality of center bearings mounted on said bolster and a side bearing mounted at each end of said arms.

2. In a truck for articulated cars comprising side frames, spaced pairs of swing links carried by said side frames, bars connecting said swing links in pairs, spring supports carried by said bars, springs mounted on said spring supports, a bolster having transversely projecting arms at its ends mounted on said springs and a plurality of center bearings mounted on said bolster.

3. In a truck for articulated cars comprising side frames, spaced pairs of swing links carried by said side frames, bars connecting oppositely positioned swing links, stirrups carried by said bars, adjustable spring supports mounted in pairs of said stirrups, springs mounted on said spring supports, spring caps carried by said springs, bars connecting said spring caps on the same side of the truck, a bolster connecting said last mentioned bars and a plurality of center bearings carried by said bolster.

4. In a truck for articulated cars comprising side frames, spaced pairs of swing links carried by said side frames, bars connecting oppositely positioned swing links transversely of the car, stirrups carried by said bars, spring supports mounted in said stirrups, springs mounted on said spring supports, spring caps carried by said springs, bars connecting said spring caps on the same side of the truck, a bolster carried by said last mentioned bars, a plurality of center bearings mounted on said bolster and a side bearing mounted over each spring cap.

5. In a car truck for articulated cars comprising side frames, brackets carried by said side frames, pairs of swing links mounted in said brackets, transversely disposed bars connecting oppositely positioned swing links, spring supports carried by said bars, springs mounted on said spring supports, a bolster having transversely extending arms bearing on said springs, a plurality of center bearings mounted on said bolster and side bearings mounted on said arms over said springs 6. In a truck for articulated cars comprising side frames having tension and compression members, means connecting said tension and compression members and providing a plurality of spaced openings between said members in each side frame, brackets attached to the side frames and spanning the openings and a plurality of swing links mounted in each bracket.

7. In a truck for articulated cars comprising side frames, a bolster having a plurality of center bearings thereon, arms, projecting laterally at the ends of said bolster, springs supporting said arms at the ends thereof and means movably supporting said springs from said side frames.

8. In a truck for articulated cars comprising side frames, a bolster having a plurality of center bearings thereon, supporting arms projecting laterally of said bolster, side bearings mounted on said arms, springs supporting said arms and means swingingly supporting said spring from said side frames.

9. In a truck for articulated cars comprising side frames, a bolster having a plurality of center bearings thereon, supporting arms projecting laterally at the ends of said bolster, springs supporting said arms at the ends thereof, side bearings mounted over and supported by said springs and means movably supporting said springs from said side frames.

10. In a truck for articulated cars comprising side frames, a bolster having a plurality of center bearings thereon, supporting arms at the ends of said bolster, springs supporting said arms, side bearings mounted on said arms at the end thereof and means movably supporting said springs from said side frames.

In witness whereof I have hereunto set my hand.

ROBERT W. JOY.